| COMPONENTS | FIRST ORDER POUNDS | FIRST ORDER PER CENT | SECOND ORDER POUNDS | SECOND ORDER PER CENT | THIRD ORDER POUNDS | THIRD ORDER PER CENT | FOURTH ORDER POUNDS | FOURTH ORDER PER CENT | FIFTH ORDER POUNDS | FIFTH ORDER PER CENT | SIXTH ORDER POUNDS | SIXTH ORDER PER CENT |
|---|---|---|---|---|---|---|---|---|---|---|---|---|
| CORK 5-10 CORK | 100 | 77.208 | 75 | 75.958 | 75 | 75.706 | 75 | 75.655 | 75 | 75.645 | 75 | 75.643 |
| 1/4 INCH TO DUST SELECTED REGRIND | | | 25 | | 25 | | 25 | | 25 | | 25 | |
| GLYCERIN | 20 | 15.442 | 15 | 15.192 | 15 | 15.141 | 15 | 15.131 | 15 | 15.129 | 15 | 15.129 |
| GLUE | 6.5 | 5.019 | 6.13 | 5.948 | 6.13 | 6.135 | 6.13 | 6.173 | 6.13 | 6.180 | 6.13 | 6.182 |
| WATER | 2.5 | 1.930 | 2.5 | 2.403 | 2.5 | 2.498 | 2.5 | 2.517 | 2.5 | 2.520 | 2.5 | 2.521 |
| PARAFORMALDEHYDE | .52 | .401 | .52 | .499 | .52 | .520 | .52 | .524 | .52 | .524 | .52 | .524 |
| TOTAL | 129.52 | 100. | 124.12 | 100. | 124.12 | 100. | 124.12 | 100. | 124.12 | 100. | 124.12 | 100. |
| GLYCERIN /CORK RATIO | 20/100 | | 20/100 | | 20/100 | | 20/100 | | 20/100 | | 20/100 | |

COMPONENT SERIES – "25-POUND REFORMULATION PLASTICIZER COMPENSATED"

Fig. 4

| COMPONENTS | FIRST ORDER POUNDS | FIRST ORDER PER CENT | SECOND ORDER POUNDS | SECOND ORDER PER CENT | THIRD ORDER POUNDS | THIRD ORDER PER CENT | FOURTH ORDER POUNDS | FOURTH ORDER PER CENT | FIFTH ORDER POUNDS | FIFTH ORDER PER CENT | SIXTH ORDER POUNDS | SIXTH ORDER PER CENT |
|---|---|---|---|---|---|---|---|---|---|---|---|---|
| CORK 5-10 CORK | 100 | 77.208 | 75 | 72.809 | 75 | 71.960 | 75 | 71.795 | 75 | 71.764 | 75 | 71.758 |
| 1/4 INCH TO DUST SELECTED REGRIND | | | 25 | | 25 | | 25 | | 25 | | 25 | |
| GLYCERIN | 20 | 15.442 | 20 | 18.423 | 20 | 18.998 | 20 | 19.109 | 20 | 19.130 | 20 | 19.134 |
| GLUE | 6.5 | 5.019 | 6.5 | 5.989 | 6.5 | 6.174 | 6.5 | 6.211 | 6.5 | 6.218 | 6.5 | 6.219 |
| WATER | 2.5 | 1.930 | 2.5 | 2.303 | 2.5 | 2.375 | 2.5 | 2.389 | 2.5 | 2.391 | 2.5 | 2.391 |
| PARAFORMALDEHYDE | .52 | .401 | .52 | .479 | .52 | .494 | .52 | .494 | .52 | .494 | .52 | .494 |
| TOTAL | 129.52 | 100 | 129.52 | 100 | 129.52 | 100 | 129.52 | 100 | 129.52 | 100 | 129.52 | 100 |
| GLYCERIN /CORK RATIO | 20/100 | | | | | | | | | | 26.6/100 | |

COMPONENT SERIES – "25-POUND REFORMULATION PLASTICIZER UNCOMPENSATED"

Inventor
GEORGE E. GARD

Fig. 5

|  | FIRST ORDER PER CENT | SECOND ORDER PER CENT | THIRD ORDER PER CENT | FOURTH ORDER PER CENT | FIFTH ORDER PER CENT | SIXTH ORDER PER CENT |
|---|---|---|---|---|---|---|
| FIRST ORDER | 100 | 20.4 | 4.45 | .84 | .17 | .04 |
| SECOND ORDER |  | 79.6 | 16.25 | 3.31 | .67 | .13 |
| THIRD ORDER |  |  | 79.6 | 16.25 | 3.31 | .67 |
| FOURTH ORDER |  |  |  | 79.6 | 16.25 | 3.31 |
| FIFTH ORDER |  |  |  |  | 79.6 | 16.25 |
| SIXTH ORDER |  |  |  |  |  | 79.6 |

PERCENTAGE OF PRECEDING ORDERS REFORMULATED AS PER FIGURE 3

Fig. 6

| SHEETS FROM TOP AND MIDDLE OF MAT | FIRST ORDER | | SECOND ORDER | | THIRD ORDER | | FOURTH ORDER | | FIFTH ORDER | | SIXTH ORDER | |
|---|---|---|---|---|---|---|---|---|---|---|---|---|
|  | COMPRESSION % | RECOVERY % | COMPRESSION % | RECOVERY % | COMPRESSION % | RECOVERY % | COMPRESSION % | RECOVERY % | COMPRESSION % | RECOVERY % | COMPRESSION % | RECOVERY % |
| TOP | 40.5 | 95 | 42.7 | 94.5 | 36 | 95 | 43.5 | 92.5 | 39 | 94 | 44 | 94 |
| MIDDLE | 43. | 95 | 38. | 95 | 43.5 | 93 | 40. | 94.5 | 38 | 94 | 38.5 | 95 |
| MAT WEIGHT | POUNDS 132.5 | | POUNDS 131.75 | | POUNDS 132.5 | | POUNDS 132.5 | | POUNDS 133.5 | | POUNDS 133.0 | |

"COMPARABLE PHYSICAL PROPERTIES OF ALL PRIME "FIRST ORDER"- SUCCESSIVE "ORDERS" CONTAINING 25 POUNDS OF SELECTED REGROUND CORK COMPOSITION

Inventor
GEORGE E. GARD
by
Attorney

Patented July 1, 1952

2,601,702

UNITED STATES PATENT OFFICE 2,601,702

CORK COMPOSITION MANUFACTURE

George E. Gard, Lancaster, Pa., assignor to Armstrong Cork Company, Lancaster, Pa., a corporation of Pennsylvania Application March 27, 1950, Serial No. 152,057

20 Claims. (Cl. 18—55)

This invention relates to cork composition manufacture and is concerned particularly with the manufacture of cork composition of the type which includes a binder which is converted or set under the action of heat while the cork is maintained under compression in a mold or the like.

In the manufacture of cork compositions, particularly those including a gelatin type binder, it is common practice to distribute the binder over the cork granules, charge the binder-coated granules into a mold, compress the mass to the desired density, and then heat the mass either in a heated oven or dielectrically. The mass is maintained in the mold until the cork granules are "set." Subsequently, the mass is discharged from the mold and is severed into sheets or articles of desired dimensions.

In the manufacture of cork composition gaskets and other cork composition products, it is desirable to have a substantially uniform density throughout the thickness of the cork composition mat; for, otherwise, the density of the gasket sheets or other articles which are severed from the mat will vary. This requires that the cork granules which constitute the major portion of the mat be secured in a fixed condition, free of any tendency to re-expand. In order to avoid this re-expansion or swelling, the mass is confined in the mold for a dwell period adequate to permit the cork granules to take a so-called "permanent set." Generally, it has been thought that this period of dwell was necessary in order to properly convert the binder which would then hold the particles in their compressed condition. It has been found, however, that a substantial portion of the dwell period is required to set or fix the cork granules against re-expansion, the binder customarily used being heat converted in a much shorter time. This is particularly true of compositions formed with a gelatin type binder. In the dielectric heating of cork compositions, for instance, it has been found that the conventional gelatin type binders can be heat converted in a period of a few minutes at temperatures in the order of 200° F. and an adequate bond obtained in such period of time. It is impossible, however, to break the mat out of the mold upon completion of the dielectric heating cycle, for the mat will swell appreciably and may even rupture internally. The density will be non-uniform, beyond any commercially acceptable limits. The dwell time in the mold subsequent to dielectric heating to convert the binder may be in the order of four to five hours, requiring a large number of molds for economical production. The molds are expensive and are bulky, weighing about 2950 pounds in the size to produce a mat 50½" x 28" x 9¼".

It is desirable, therefore, particularly where dielectric heating is employed, to reduce the dwell time as much as possible, but such reduction in dwell time should not be obtained at the sacrifice of uniformity in density in the cork composition mat. It is one of the objects of this invention to provide a method of manufacture of cork composition which will substantially reduce the dwell period while producing a product having a substantially uniform density.

It is known that natural cork is a resilient material and when compressed tends to return to its original condition upon removal of the loading force applied to compress it. When, however, the loading force is applied for a sufficiently long period of time, stress within the cork which causes it to return to its normal condition is relaxed gradually; and, upon removal of the loading force, the stress-relaxed cork does not recover or re-expand to its original condition. While such stress relaxation, set, or so-called permanent setting of the cork requires that the mass of cork be held under compression for a relatively long period of time when the compression is effected at room temperature, the stress relaxation process may be accelerated by heating the cork while under compression. Also, the rate of stress relaxation or setting is a function of the size of the pieces of cork undergoing treatment. Where the cork is ground into granules, the rate of relaxation is much faster than with large blocks of natural cork bark.

Cork which has been set or stress-relaxed in compressed condition may be re-expanded to almost its normal size by the application of raw steam or other hot vapor to the cork while unconfined and free to expand. Cork cannot be stress-relaxed or set in compressed condition in the presence of steam or hot vapor, and this probably accounts in a large measure for the long time required to secure stress relaxation in adhesive-bound cork composition molded under heat and pressure—the vapor pressure of the binder counteracts the effect of the heat in accelerating the set.

There is another problem of considerable significance encountered in the manufacture of cork compositions and in the cutting of cork gaskets and other products which arises because of the fact that there is a fairly substantial portion of each mat which is normally discarded. In the cutting of a crank case gasket of cork composition, for example, a substantial portion in the center of the sheet from which the crank case gasket is cut is removed and normally it is stocked; and, where possible, smaller gaskets are cut from the center stock. Nevertheless, this leaves a portion of unusable gasket material. There are also edge trimmings which are formed from the portions of the gasket sheets surrounding the irregular outer periphery of the crank case gasket. In a well-managed plant, so-called center scrap and edge trimmings may represent as much as 25% or more of the total mat production, and its utilization is a substantial factor in the economical operation of the plant.

Some of this material has been salvaged by regrinding it and using it instead of prime granulated cork, binding the particles with conventional binders to produce a mat. This has produced a low-quality mat for which there has been but a small demand, wholly incapable of consuming the center scrap and edge trimmings produced. There has been no process available to the art which would provide for the reuse of center scrap, edge trimmings, and similar material in the manufacture of cork composition of a quality comparable with the cork composition from which the center scrap or the like has been produced.

Another object of this invention is to provide a process by which a high-quality cork composition may be produced in which a substantial quantity of center scrap or the like may be incorporated into the composition.

Where scrap is reused in subsequent runs of the same composition, there is present the danger of degrading the composition in successive runs by substantial progressive change in the ratios of the various ingredients used in making the composition or by reduction of the size of the cork granules in successive runs. To be commercially practicable, the process must provide for infinite reuse of material from previous runs without product degradation.

An additional object of the invention, therefore, is to provide a process for manufacturing cork compositions which will produce a substantially uniform quality of product utilizing portions of previous composition in successive runs in an infinitely repeating manufacturing cycle.

A further object of the invention is to provide a process in which the mold dwell period may be reduced and at the same time a substantial quantity of what would normally be refuse cork composition may be utilized.

Other objects of the invention will become apparent from a consideration of the following description of preferred embodiments of the invention which are given for purposes of illustrating certain principles of the invention which are of general applicability.

In the accompanying drawing:

Figure 3 is a table of component series for a typical cork composition, following the teachings of the invention in the incorporation of reground cork composition and compensating for cork softening agent;

Figure 4 is a table similar to Figure 3 for the same cork composition without compensating for the cork softening agent;

A typical cork composition may be formulated as follows:

*Example I*

| | Parts by weight |
|---|---|
| 5 to 9 mesh cork (U. S. standard) | 100 |
| Glycerin | 20 |
| Glue | 6.5 |
| Water | 2.5 |
| Paraformaldehyde | .52 |

In the above formulation the cork is a granulated natural cork and is referred to as "prime" cork in the sense that it has not been previously used. The particle size is determined in the conventional commercial manner by a screen analysis. The glycerin is a cork softening agent. Glue is the binder, and water is added to facilitate the distribution of the glue over the cork granules, the glycerin constituting the major liquid component of the binder. The paraformaldehyde is a hardening or converting agent for the glue and is effective for insolubilizing it.

In the preparation of the cork composition, the glue, glycerin, and water are mixed together and the glue is permitted to swell. The swollen glue-glycerin-water mixture is then heated to reliquefy it, and it is distributed over the cork granules in a mixer, each cork granule being thinly coated with the binder material. The coated cork granules are essentially free-flowing and are then charged into a mold. In the manufacture of a mat 9¼" thick x 28" x 50½", 133 pounds of the above mix may be charged into the mold and compressed to reduce the volume to the mat size stated. This should produce a mat having a theoretical average density of about 17.5 pounds per cubic foot. Loss of moisture during the baking cycle reduces this somewhat, however. The compacted mass of cork in the mold is then heated to a temperature of about 180 to 200° F. which is effective for inducing reaction between the glue and the paraformaldehyde, insolubilizing the glue and producing a binder which is essentially stable and not subject to deterioration under normal atmospheric conditions. Where the mat is heated in an oven, the time cycle may be about 6½ hours in order first to heat the mass throughout its extent to the desired temperature for activation of the binder, and the mat is confined under pressure for an additional 2½ hours at the end of which time the cork granules will be set and the mat may be removed from the mold. It is well known that cork is an excellent heat insulator and that considerable time is required to conduct heat through the mold walls and through the mass of cork composition to the center thereof. With dielectric heating of the mass in the mold, the mass is heated throughout at the same rate and the heating cycle may be in the order of 4½ minutes. Thereafter, the mass may be held in the mold under compression until a permanent set has been secured in the cork granules. The set rate varies with the type of binder, the temperature of curing of the binder, the size of the cork granules, and other variable factors. A method of manufacturing cork composition and the like in which heating of the mass is controlled in accordance with the pressure exerted by the mass is disclosed and claimed in my copending application Serial No. 163,747 filed May 23, 1950, and entitled "Method and Apparatus for Heating Materials Dielectrically."

Figure 1:
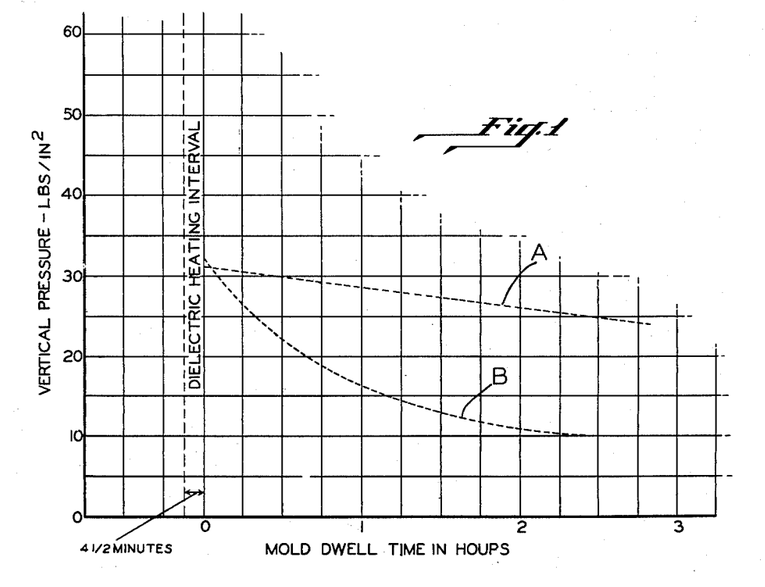
Figure 1 is a chart of cork "set" curves.

It is essential to maintain the mat in the mold until the cork has been set, for the resultant product will be of nonuniform density and substandard in physical properties if removed from the mold prior to proper setting or stress relaxation of the cork particles. This is illustrated in Figure 1 where the degree of stress relaxation or set of the cork has been measured by the use of a strain element affixed to one of the end plates which confine the mass in the mold, which strain element measures the pressure exerted by the cork against the end plates after pressing and during the mold dwell period. This pressure is a direct measure of the degree of set or stress relaxation.

Referring to Figure 1, it will be noted that the curve marked A, which represents a mat of cork composition produced precisely in accordance with the formulation and the dielectric heating procedure described above, exerted a vertical pressure of about 28 pounds per square inch one hour after the dielectric heating cycle had been completed. The pressure was in the order of 26 pounds at the end of two hours, and about 24 pounds at the end of two and three-quarter hours, at which time the mat was broken out of the mold. The mat which was confined within the mold, the long dimension of which was 50½ inches, actually expanded to a length of 51 1/16 inches. There was a substantial "growth" of the mat in all directions, but growth in the longest mold dimension is usually taken as a basis for comparison of growth.

Figure 2:
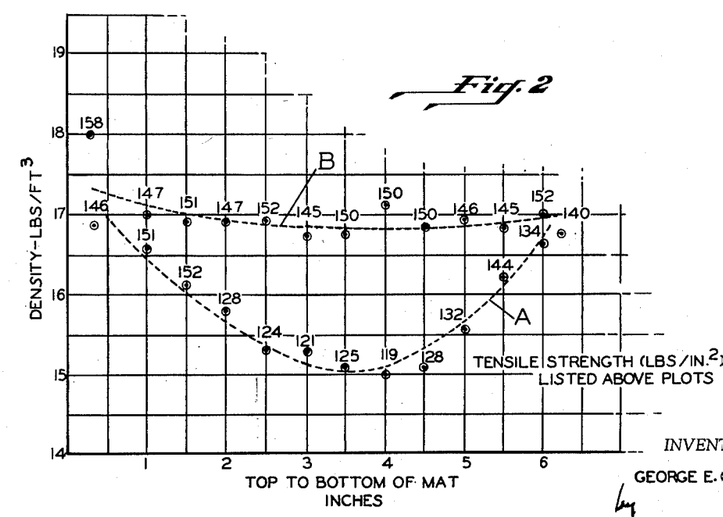
Figure 2 is a chart showing density variations in a mat of normal cork composition and a mat of cork composition broken from the mold prior to proper setting of the cork granules.

The chart of Figure 2 shows the nonuniformity of the density of the mat A from the center toward the top and bottom thereof. The average density desired was 17 pounds per cubic foot; but due to the fact that the cork granules had not been set and the product expanded substantially upon its release from the mold, the density fell to as low as 15 pounds per cubic foot midway of the thickness of the mat. As the density decreased, the tensile strength of the composition, measured in pounds per square inch, also decreased. The tensile strength figures have been included on the curve A of Figure 2. A mat made from the formulation of Example I and removed from the mold before the cork had been properly set would not meet the required density and strength specifications and would have to be degraded and sold as a fifteen-pound density cork composition. It is common practice in the cork composition industry to actually include sufficient cork and binder in the charge deposited in the mold to make a product of higher average density than required by the specifications in order to allow for undesired swelling of the mat. For instance in making a 17-pound density composition, sufficient material will be charged into the mold to produce a mat having an average density of 18 to 19 pounds, so that should re-expansion occur the average density will not fall below the desired 17 pounds. This is costly to the cork composition manufacturer and may be objectionable in some instances to the user if closer limits on density variations are required.

Curve B of Figure 2 shows an identical type of cork composition mat removed from the mold after proper setting of the cork granules. It will be noted that the density is much more uniform and the tensile strength is more nearly constant throughout the thickness of the mat.

Setting of the cork granules is believed to be influenced by the vapor pressure of the formulation, and the swelling of the cork composition upon release from the mold is affected by the elastic strength of the binder at the time the mat is released and also by the degree of set or stress relaxation taken by the cork particles. The elastic strength of the binder must be sufficiently great to hold the cork granules against re-expansion if they have not taken a complete and permanent set at the time of release of the mat from the mold. The stress relaxation varies with different grades of cork, different particle size distribution, and the type of grinding by which the natural cork is reduced to particles or granules. In any event, the pressure exerted on the end plates of the mold during the dwell period is a direct measure of the stress relaxation; and with binders of known physical characteristics, the precise degree of swelling can be predicted with great accuracy, in the order of plus or minus 1/16 of an inch in the long mold dimension of 50½ inches, for example. The witnessed pressure is, of course, a combination of the residual pressure of the cork which is exerted against the end plates and the confined vapor pressure of the binder. A "growth" of about ¼ of an inch in the long dimension of 50½ inches is allowable, although it is preferred to reduce it to the smallest possible figure consistent with economical manufacturing practices. With a composition of the type referred to above, it is known that a pressure of about 15 pounds per square inch on the end plates will result in a swelling of ¼ of an inch or less along the length of the mat. Pressures in the order of 10 pounds will indicate that the mat will be substantially free of swelling upon extraction from the mold, the cork granules having been set at least to the point where their force of re-expansion is less than the elastic strength of the binder.

Where the vapor pressure of the composition, i. e., the binder constituents of the composition such as the glue, glycerin, and water mixture, is high, the time required for the cork to be substantially completely stress-relaxed or set is higher than where the vapor pressure is lower. Here there are two opposed forces at work. The applied heat would normally hasten the stress relaxation of the cork granules were it not for the presence of the liquid binder, the vapor pressure of which counteracts the stress relaxation action in the cork granules. Such relaxation cannot be obtained until the vapor pressure of the binder in the composition has fallen to a low level, generally in the order of about 7 pounds per square inch with the composition of Example I. The vapor pressure, of course, varies with the temperature of the composition; and where higher temperatures are required to convert the binder, the setting or stress relaxation of the cork granules requires a longer time. For instance, a phenol formaldehyde resin binder with glycerin as the cork softening agent will require a curing temperature of about 220 to 240° F., and the vapor pressure of the composition will be substantially above the vapor pressure of a similar composition having a glue binder; and since the cork set rate is affected by the vapor pressure, the mold dwell time will be longer. Preset cork granules if unconfined can be actually re-expanded by applying steam to them; but when confined under pressure in a mold, the forces in the granules are insufficient to overcome the applied confining forces and the vapor pressure forces of the binder, and re-expansion to any substantial extent does not occur.

It has been established that by combining a portion of preset cork granules with prime cork granules, a substantial reduction in mold dwell time may be effected. This has been illustrated graphically in Figure 1 where vertical pressures have been plotted against mold dwell time after baking with all prime cork in curve A and with 25% of preset cork and 75% prime cork in curve B. The curves are exponential and show that the inclusion of a minor amount, 25% in the example illustrated, of preset cork reduces the mold dwell time by an amount which is not in a lineal relationship with the quantity of preset cork included.

Since the use of center scrap and die trimmings is one of the problems facing the industry, preferred practice is to secure preset cork granules by comminuting the die trimmings and center portions from a previous run of substantially the same cork composition made from granulated cork of about the same granule size, having essentially the same binder and being of essentially the same average density. For instance, in the manufacture of a new mat of cork composition, portions of an acceptable mat of the composition made in accordance with the formulation of Example I may be broken or ground into particles. The particle size should be as large as is commensurate with packing or interfitting of the particles in the composition and handling. The method of grinding should be such as not to shred or destroy the bonded areas within the agglomerated particles, and the range of particle size should preferably include the entire range produced in regrinding in order that the best packing constant and yield may be obtained. Satisfactory results have been obtained by grinding ⅛" thick center scrap and die trimmings on a Mikro-Pulverizer having ¼" diameter holes in the bed plate through which the comminuted composition is forced during the grinding. This is a hammer mill type of grinder and the cork particles may be generally classified as ¼" to dust.

A mat prepared from the composition of the above example utilizing 25% of the ¼" to dust comminuted composition with 75% of 5 to 9 mesh prime cork may be formulated as follows:

*Example II*

| | Parts by weight |
|---|---|
| 5 to 9 mesh cork | 75 |
| ¼" to dust select comminuted composition | 25 |
| Glycerin | 15 |
| Glue | 6.13 |
| Water | 2.5 |
| Paraformaldehyde | .52 |

The mixing procedure is exactly the same as in Example I and 133 pounds of the composition are disposed in a mold and compressed to the same size as in Example I to produce a mat having a theoretical average density of 17.5 pounds. The curing cycle with dielectric heating is in the order of 4½ minutes with the mat attaining a temperature of 180 to 200° F.; but as will be observed from Figure 1, curve B, the mold dwell time is substantially reduced. The pressure exerted on the end plates was about 16 pounds per square inch after one hour of dwell time, and at the end of two hours the pressure was down to about 11 pounds. As mentioned above, when the pressure is in the order of 15 pounds, the mat may be removed from the mold without excessive swelling, the growth being ¼ of an inch or less along the length of 50½ inches. Thus it will be seen that the mat made with 25% of preset cork may be removed from the mold after a dwell time of about one hour, insofar as cork set is concerned, but with a temperature in the range of 180 to 200° F. it requires about 1½ hours for the glue to be properly activated. Where higher temperatures are employed, the glue may be activated in much less time, in a very few minutes actually, but these higher temperatures cause an increase in the vapor pressure which results in an increase in cork set time. The two factors must be considered and balanced against other limiting factors. With dielectric heating, a mold dwell time of as much as two to two and one-half hours is not objectionable. If shorter dwell times than one and one-half to two and one-half hours are desired, the vapor pressure of the binder may be reduced by first coating the cork granules with the binder and then drying the binder by blowing air over and through the mass of binder-coated granules. This will result in a reduction in the water content and there will be reduction in vapor pressure, permitting the attainment of higher temperatures for the more rapid setting of the binder without increase in the cork-setting time.

It will be noted by comparing the formulations of Examples I and II that where preset cork is used, the quantity of glycerin or other cork softening agent which is employed is reduced proportionately with the reduction in the quantity of prime cork. In Example I, 20 pounds of glycerin are used with 100 pounds of cork. In Example II, 15 pounds of glycerin are used with 75 pounds of prime cork and 25 pounds of preset material. The preset material obtained from the mat of Example I contains a cork softening agent in a quantity representing 20% of the weight of the cork. Thus the quantity of cork softening agent added provides essentially the same ratio of total cork softening agent to cork granules, including both the prime unset cork granules and the preset cork granules, as the ratio of the cork softening agent to preset cork granules in the comminuted particles of cork composition. There is a slight reduction in the quantity of glue which is added as the binder in Example II over the quantity used in Example I. This is calculated on the basis of the particle size of the reground material but is of no substantial importance. The difference is so small as to be insignificant and may be disregarded.

The reduction in the quantity of glycerin is important from the standpoint of maintaining a constant product as the process is repeated, utilizing preset cork from a previous batch in a subsequent run, and then reusing a portion of such subsequent run in a further run, and so on. The reformulation must be accomplished so as to produce a series in which successive terms, showing the relationship of components, have insignificant change and converge very rapidly to a constant ratio of components that differ inconsequentially from the primary product. This is necessary so as to avoid any alteration in the ratio of the components of the mixture which would affect the physical properties of the cork composition. The greatest variance in physical properties will occur as a result of variations in the quantity of cork and the ratio of cork to plasticizer.

To illustrate as a mathematical example the changes in the ratio of the components of a composition such as Example I and Example II under repetitive reformulations, the table of Figure 3 is presented. This shows the percentages of cork, glycerin, glue, water, and paraformaldehyde through six "orders" or steps. The first order is the composition of Example I. The second order is the composition of Example II, formulated of 75 pounds of prime cork and 25 pounds of portions from the first order composition ground to a size of ¼" to dust. The third, fourth, fifth, and sixth orders are similar to the second order, and each succeeding batch includes 25% of ¼" to dust regrind material from the previous order. The percentages shown in the chart for the various components are obtained by breaking down the components existing in the 25 pounds of reground material taken from the preceding order and adding these values to the various basic components, namely, cork, glycerin, glue, water, and paraformaldehyde.

Analysis of the chart of Figure 3 shows that the cork component decreases from 77.2% of the total of the first order formulation to a virtually constant limit of 75.6% of the total sixth order formulation. The glycerin component falls from 15.442% in the first order to 15.129% in the sixth order formulation. It will be noted that by the sixth order, all components have converged to an essentially constant limit; that is, the percentage of each component to the whole differs from the fifth order to the sixth order only in thousandths of a per cent. This becomes wholly insignificant when it is considered that the accuracy of formulation in commercial practice varies by plus or minus 1% as a minimum and may be as high as plus or minus 5%.

As an illustration of reformulation with 75 pounds of prime cork and 25 pounds of reground from the previous order without reducing the plasticizer, the table of Figure 4 is presented. The successive orders of this component series are formulated in the same manner as in Figure 3 except that the plasticizer has not been reduced. An analysis of the table of Figure 4 indicates that the percentage of cork in the formulation will drop from 77.2% to 71.75% in the sixth order, and the ratio of glycerin to cork will change from 20 pounds for each 100 pounds of cork in the first order to 20 pounds for each 75 pounds of cork in the sixth order or 26.6 pounds of glycerin per 100 pounds of cork. With such extensive change in the formulation, major changes in the physical properties of the composition would result, particularly the compression and recovery characteristics, the former of which is particularly important in gaskets. The tensile strength may also fall below the desired minimum.

Figure 5:
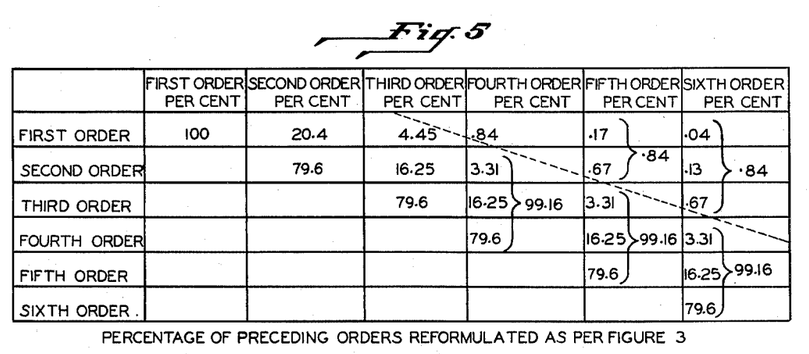
Figure 5 is a table showing percentages of preceding orders using the reformulations of Figure 3.

With a 25% reground component it has been found that there will be an insignificant amount of material which has been ground more than twice, as the number of orders increases. This is illustrated in the table of Figure 5 which is based on reformulation as set out in Figure 3. Analysis of this table indicates that once the series has been repeated to the fourth order, the composition becomes essentially constant with respect to percentage of total components that come from preceding orders. In other words, in any order after the third order there always exists 79.6% of primary material, 16.25% of secondary material, 3.31% of tertiary material, and .84%, an insignificant amount, from material reground more than two times. This means that in all orders containing reground material, a constant value, 79.6% of the material, is prime; in all orders after the second there is a constant value of 16.25% of the material that has been reground once, or is secondary material. After the third order, there is in each order a constant value of 3.31% of the material that has been reground twice. Thus, after the third order there will be 99.16% of the material which will have a substantially constant particle size, representing 79.6% prime material, 16.25 primary regrind, and 3.31% secondary regrind.

In Example II, 25 parts by weight of preset cork composition have been incorporated with 75 parts by weight of prime cork. The quantity of preset cork used will vary with different types of compositions being produced, depending upon particle size, density, and other variable factors. Generally, in order to obtain a significant reduction in mold dwell time at least about 10% by weight of preset cork should be used, based on the total weight of the cork component of the composition.

Where the product to be produced will have substantially the same density as the average density of the preset cork granules, which will be the case where center scrap and edge trimmings from one run of a particular composition is used in a subsequent run of the same composition, the quantity of preset cork will preferably be in the range between about 12½% and 25%. (Where reference is made to the average density of the preset cork particles or granules, the individual particles or granules as such are referred to and not an uncompacted mass of the granules. To illustrate, the average density of edge trimmings and center scrap from a 17-pound density mat will provide particles having an average density of 17 pounds. However, a mass of such particles disposed in a container in uncompressed condition may have a density in the order of 6 to 7 pounds per cubic foot because of the large number of voids between the loose uncompacted particles.)

Where the density of the finished product is to be less than the average density of the preset cork granules, the total quantity of preset cork which can successfully be used to produce a product of quality comparable to the first order or any preceding order will be less, for such particles of higher density will be randomly dispersed throughout the mass and if present in large volumes may have a deleterious effect on the compressibility and other physical characteristics of the resultant article. As pointed out above, there is substantially no re-expansion of the particles in the mold, even though the mass be heated, for the re-expansion forces are less than the applied forces of compression and the vapor pressure effect.

Where products having higher density than the average density of the preset cork particles are to be produced, greater quantities of preset cork may be used, depending upon the difference in density between the preset cork and the higher density of the product to be produced. As an example, in using preset cork in which the granules have an average density of 15 pounds per cubic foot in the manufacture of a product which is to have a density of 17 pounds per cubic foot, substantially more preset cork can be used than where the densities are to be the same or where the density of the finished product is to be less than the preset cork density. The reason for this is that the preset cork having the lower density will be compressed in the mold and thus a better interfitting of the particles and granules will be obtained. Quantities up to about 35% by weight of preset cork based on the total weight of the cork component of the composition may be used successfully in Example II where the density difference between preset cork and the denser product to be produced is in the order of about 2 pounds. The lower density cork particles may be secured from edge trimmings and centers of the lower density, or a lower density product may be secured by grinding or otherwise breaking up the cork granules in the presence of steam or other vapor which serves to partially re-expand the cork granules.

A preferred practice is to use preset cork having essentially the same average density as the product to be produced, utilizing center scrap and edge trimmings from the same composition. Manufacturing operations on occasion may make it desirable to use preset cork granules of a higher density than the final density desired in the product to be produced; and in such instances, it is preferred to use particles the density of which is not greater than 112% of the density of the final product to be produced. Stated in other words, the average density of the final product preferably should not be less than about 88% of the average density of the preset cork granules.

While the invention is of particular importance where a reduction in mold dwell time is a factor of commercial significance, the invention is useful also where such dwell time is not important. With some binders, particularly those having a higher vapor pressure at activation temperatures, the mold dwell period will be so influenced by the high vapor pressure that the incorporation of preset cork will not reduce the mold dwell time by an amount which is of great significance; but, nevertheless, the invention provides a process by which preset cork granules may be repeatedly incorporated in succeeding batches without degrading the quality of the product, and thus the invention makes possible the utilization of what would otherwise be refuse material.

In place of using comminuted cork composition as the preset cork component, the cork granules may be preset in other ways. One commercially practicable way of obtaining preset cork granules is to compress the granules into a bale and hold the mass under such compression for a period of a week or two, at the end of which time the cork granules will have been set. In this way the density of the preset cork granules may be conveniently controlled by baling to a desired density. Where preset cork granules of this type are used, reformulation of the binder constituents is not necessary. The proportioning of preset to prime cork will be the same as discussed above in connection with the preset cork secured by comminuting cork composition. Of course, a combination of both types of preset cork may be used.

The cork composition made in accordance with this invention will have physical characteristics at least equivalent to those produced by conventional practice, even though a substantial quantity of edge trimmings and center scrap be incorporated and even though the mold dwell time be reduced to a point at or below which excessive swelling and degradation would occur if the product were made by conventional practice.

Figure 6:
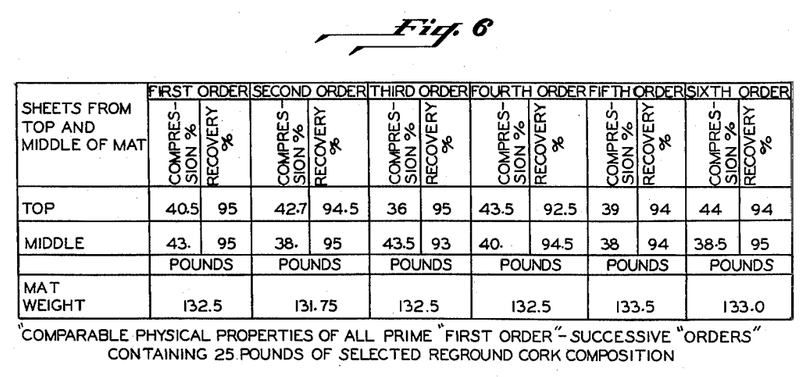
Figure 6 is a table of comparable physical properties of various "orders" reformulated as indicated by Figure 3.

The compression characteristics which are of most significance with gasket compositions, such as Example II, are shown in Figure 6 for the first to the sixth order of specimen mats made in accordance with the invention. It will be noted that the per cent compression of the top and middle sheets from the various mats was well within the limits of 30 to 50% considered as standard for a gasket composition having an average density of 17 pounds. The per cent compression is measured by applying a load of 100 pounds to a one square inch disk or foot placed upon a ⅛" sheet of the cork composition for one minute. Ninety-nine pounds of the load are then removed and the per cent recovery is measured after one minute. The disk or foot and its associated mechanism weigh one pound.

The invention finds particular usefulness in the manufacture of cork compositions with a tanned or insolubilized glue binder, but it is not limited to the manufacture of glue type compositions. As pointed out above, the phenol formaldehyde type binders may be used; and urea formaldehyde, resorcinol formaldehyde, and other resin type binders may be substituted. Mixtures of glue and resin type binders may also be used. In fact, the invention in some of its aspects will be useful with all types of cork compositions.

Glycerin has been given as the cork softening agent in the above examples. Other softening agents may be used such as diethylene glycol.

The proportioning of binder ingredients is not critical; and the invention is not directed to any proportioning, as wide variations may occur with different cork compositions for various uses.

I claim:

1. In a method of making cork composition the steps comprising combining: (a) particles of comminuted cork composition including preset cork granules, a binder, and a cork softening agent, some of said particles including portions at least of more than one cork granule bonded together by said binder, (b) prime unset cork granules, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder to join said particles and granules together, and confining said combined materials under pressure until said prime unset cork granules have been substantially completely set and said particles and granules have been bonded together by said binder.

2. In a method of making cork composition the steps comprising combining: (a) prime unset cork granules, (b) at least 10% by weight, based on total cork weight, of particles of comminuted cork composition, including preset cork granules, a binder, and a cork softening agent, some of said particles including portions at least of more than one cork granule bonded together by said binder, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder to join said particles and granules together, and confining said combined materials under pressure until said prime unset cork granules have been substantially completely set and said particles and granules have been bonded together by said binder.

3. In a method of making cork composition the steps comprising combining: (a) prime unset cork granules, (b) about 25% by weight, based on total cork weight, of particles of comminuted cork composition including preset cork granules, a binder, and a cork softening agent, some of said particles including portions at least of more than one cork granule bonded together by said binder, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder to join said particles and granules together, and confining said combined materials under pressure until said prime unset cork granules have been substantially completely set and said particles and granules have been bonded together by said binder.

4. In a method of making cork composition the steps comprising combining: (a) particles of comminuted cork composition including preset cork granules, a binder, and a cork softening agent, some of said particles including portions at least of more than one cork granule bonded together by said binder, (b) prime unset cork granules, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder to join said particles and granules together, compressing said combined materials into a mass the average density of which is not less than about 88% of the average density of the preset cork granules, and maintaining said combined materials under compression until said prime unset cork granules have been substantially completely set and said particles and granules have been bonded together by said binder.

5. In a method of making cork composition the steps comprising combining: (a) prime unset cork granules, (b) at least 10% and not more than 35% by weight, based on total cork weight, of particles of comminuted cork composition including preset cork granules, a binder, and a cork softening agent, some of said particles including a portion at least of more than one cork granule bonded together by said binder, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder to join said particles and granules together, compressing said combined materials into a mass the average density of which is not less than about 88% of the average density of the preset cork granules, and maintaining said combined materials under compression until said prime unset cork granules have been substantially completely set and said particles and granules have been bonded together by said binder.

6. In a method of making cork composition in which a portion of one cured mass of cork composition is comminuted and used in a succeeding mass of essentially the same composition, the steps comprising mixing together: (a) prime unset cork granules, (b) between 12½% and 25% by weight, based on total cork weight, of particles of comminuted cork composition of essentially the same average density and composition as the one to be formed, said comminuted composition including preset cork granules, a binder, and a cork softening agent, some of said particles being larger than the average size of the original cork granules in said composition, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder essentially the same as the binder of the preset cork particles, compressing said combined materials to an average density which is essentially the same as the average density of said comminuted cork composition, and maintaining said combined materials under compression until said prime unset cork granules have been substantially completely set and said particles and granules have been bonded together by said binder.

7. In a method of making cork composition in which a portion of one cured mass of cork composition is comminuted and used in a succeeding mass, the steps comprising mixing together: (a) prime unset cork granules, (b) particles of comminuted cork composition of essentially the same composition as the one to be formed but of a lower average density, said comminuted composition including preset cork granules, a binder, and a cork softening agent, some of said particles being larger than the average size of the original cork granules in said composition prior to comminution, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder essentially the same as the binder of the preset cork particles, compressing said combined materials to an average density which is greater than the average density of said comminuted cork composition, and maintaining said combined materials under compression until said prime unset cork granules have been substantially completely set and said particles and granules have been bonded together by said binder.

8. In a method of making cork composition in which a portion of one cured mass of cork composition is comminuted and used in a succeeding mass of essentially the same composition, the steps comprising mixing together: (a) prime unset cork granules, (b) between 12½% and 25% by weight of particles of comminuted cork composition of essentially the same composition as the one to be formed but of a higher average density including preset cork granules, a binder, and a cork softening agent, some of said particles being larger than the average size of the original cork granules in said composition, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder essentially the same as the binder of the preset cork particles, compressing said combined materials to an average density which is up to 12% less than the average density of said comminuted cork composition, and maintaining said combined materials under compression until said prime unset cork granules have been substantially completely set and said particles and granules have been bonded together by said binder.

9. In a method of making cork composition the steps comprising combining: (a) prime unset cork granules, (b) at least 10% by weight, based on total cork weight, of particles of comminuted cork composition including preset cork granules, a glue binder, and a cork softening agent, some of said particles including portions at least of more than one cork granule bonded together by said binder, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a glue binder to join said particles and granules together, and confining said combined materials under pressure until said prime unset cork granules have been substantially completely set and said particles and granules have been bonded together by said binder.

10. In a method of making cork composition the steps comprising combining: (a) prime unset cork granules, (b) at least 10% by weight, based on total cork weight, of particles of comminuted cork composition including preset cork granules, an insolubilized glue, and a cork softening agent consisting principally of glycerin, some of said particles including portions at least of more than one mork granule bonded together by said binder, (c) a quantity of glycerin which will provide essentially the same ratio of total glycerin to cork granules, including both the prime unset cork granules and the preset cork granules, as the ratio of the glycerin to preset cork granules in the comminuted particles, and (d) a glue binder including an insolubilizing agent for the glue, and confining said combined materials under heat and pressure until said prime unset cork granules have been substantially completely set and said glue binder has been insolubilized to bond said particles and granules together.

11. In a method of making cork composition in which a portion of one cured mass of cork composition is comminuted and is used in a succeeding mass of essentially the same composition, the steps comprising combining: (a) prime unset cork granules, (b) about 25% by weight, based on total cork weight, of particles of comminuted cork composition of essentially the same average density as the composition to be formed including preset cork granules of essentially the same average granule size as the unset cork granules, an insolubilized gelatin binder, and a cork softening agent, some of said particles including portions at least of more than one cork granule bonded together by said binder, (c) a quantity of cork softening agent which will provide essentially the same ratio of total cork softening agent to cork granules, including both the prime unset cork granules and the preset cork granules, as the ratio of the cork softening agent to preset cork granules in the comminuted particles, and (d) a binder including gelatin and an insolubilizing agent therefor, compressing said mass to an average density essentially the same as the average density of the preset cork particles, heating said mass to a temperature at which said binder will be insolubilized, and maintaining said mass under heat and compression until said prime unset cork granules have been substantially completely set and said particles and granules have been bonded together by said insolubilized binder.

12. In a method of reducing the mold dwell time in the manufacture of cork composition, the steps comprising randomly interspersing with prime unset cork granules at least 10% by weight of preset cork granules based on the total weight of the cork, said preset cork granules having a known average density, coating said granules with a binder, compressing the binder-coated granules to an average density which is not less than about 88% of the average density of the preset cork granules, and setting said prime cork granules and said binder while under said compression.

13. In a method of reducing the mold dwell time in the manufacture of cork compositions, the steps comprising randomly interspersing prime unset cork granules and between 10% and 35% by weight of preset cork granules based on the total weight of the cork, coating said granules with a binder, compressing the binder-coated granules to an average density which is not less than about 88% of the average density of the preset cork granules, and heat setting said prime cork granules and said binder while under said compression.

14. In a method of making cork composition, the steps comprising confining a mass of prime unbound cork granules under pressure until the granules have been set, releasing the pressure, randomly interspersing prime unset cork granules with said preset granules, coating the granules with a heat-activatable binder, compressing the binder-coated granules to a desired configuration, and heat setting said binder and said prime unset cork granules.

15. In a method of making cork composition, the steps comprising baling prime unbound cork granules under pressure to increase the average density thereof, maintaining said granules under baling confinement until said granules have been substantially completely set, releasing said granules from confinement, randomly interspersing with prime unset cork granules at least 10% by weight of said preset cork granules based on total cork weight, coating said prime and preset granules with a heat-activatable binder, heating said confined mass to set said binder, and maintaining said mass under confinement until the prime unset cork granules have been substantially completely set.

16. In a method of making cork composition, the steps comprising comminuting cork composition in the presence of hot vapor to reduce the cork composition to particles and simultaneously therewith partially re-expand the cork granules, mixing said partially re-expanded cork granules with prime unset cork granules and a binder, compressing the combination to an average density which is not less than about 88% of the average density of the partially re-expanded cork granules, and setting said prime unset cork granules and said binder while under said compression.

17. In a method of making cork composition, the steps comprising randomly interspersing prime unset cork granules and between 10% and 35% by weight of preset cork granules based on the total weight of the cork, coating said granules with a glue binder, compressing the binder-coated granules to substantially the same average density as the average density of the preset cork granules, and setting said prime cork granules and said binder while under said compression.

18. In a method of making cork composition, the steps comprising randomly interspersing prime unset cork granules and about 25% by weight of preset cork granules based on the total weight of the cork, coating said granules with a heat-activatable binder, compressing the binder-coated granules, and setting said prime cork granules and said binder while under compression by the application of heat thereto.

19. As a new article of manufacture, a cork composition made in accordance with the method of claim 1.

20. As a new article of manufacture, a cork composition made in accordance with the method of claim 12.

GEORGE E. GARD.

REFERENCES CITED

The following references are of record in the file of this patent:

UNITED STATES PATENTS

| Number | Name | Date |
|---|---|---|
| 1,996,757 | Elbel | Apr. 9, 1935 |

FOREIGN PATENTS

| Number | Country | Date |
|---|---|---|
| 479,353 | Great Britain | Jan. 31, 1938 |